June 24, 1969   D. K. HOLLINGSHEAD   3,451,713
SAFETY ENCLOSURE AND CAB FOR TRACTORS
Filed Sept. 15, 1967

INVENTOR
DONALD K. HOLLINGSHEAD
BY
Dick, Zarley, McKee & Thomte
ATTORNEYS

United States Patent Office 3,451,713
Patented June 24, 1969

3,451,713
SAFETY ENCLOSURE AND CAB FOR TRACTORS
Donald K. Hollingshead, R.R. 2, Ogden, Iowa 50212
Filed Sept. 15, 1967, Ser. No. 667,890
Int. Cl. B62d 27/02, 29/00, 23/00
U.S. Cl. 296—28                                   7 Claims

ABSTRACT OF THE DISCLOSURE

A protective enclosure disposed on the platform of a tractor and having a cab unit substantially enclosing the protective enclosure. The protective enclosure having a frame structure pivotally connected to a support assembly on the axle of the tractor, the support assembly extending under the enclosure structure and upwardly at the rear thereof to limit movement. Members may be included to extend from the axle forwardly to detachably connect to the protective enclosure.

---

It has been found that many deaths of operators of tractors are caused by rollover of the tractor and could be prevented if appropriate protection is provided the tractor operator. It is the intent of this invention to provide a crush-proof protective enclosure for the operator which provides a frame for the cab on the tractor. It is intended that the protective enclosure will provide protection against a complete rollover of 180 degrees. Moreover, the protective enclosure and cab of this invention will provide the operator protection from exposure to the elements, noise, etc.

These and other features and advantages of this invention will become readily apparent to those skilled in the art upon reference to the following description when taken into consideration with the accompanying drawings, wherein.

Figure 1:
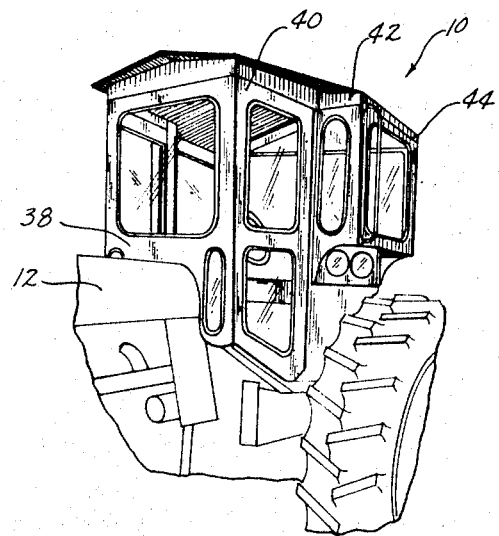
FIG. 1 is a fragmentary perspective view of the protective enclosure and cab mounted on a tractor.

The protective enclosure and cab is referred to generally in FIG. 1 by the reference numeral 10 and is shown mounted on a tractor 12.

Figure 3:
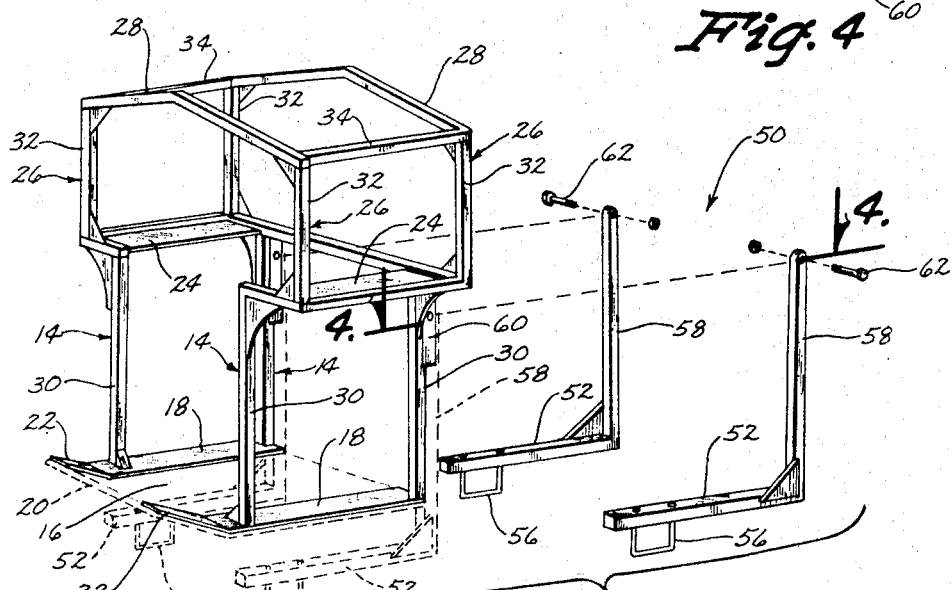
FIG. 3 is an exploded perspective view of the protective enclosure and the support assembly for securing it to the tractor.

In FIG. 3 the frame of the protective enclosure is seen to include a pair of upstanding frames 14 on opposite sides of a driver station 16. The upstanding frames 14 are integrally connected to feet members 18 which matingly engage the top surface of the tractor platform 20. The forward ends 22 of the feet members 18 extend forwardly and upwardly along the platform surface 20.

At the upper ends of the frame members 14 a pair of ledges 24 are provided which extend laterally outwardly in opposite directions and are connected at their outer side edges by a second pair of upstanding frames 26 which are interconnected at their top edges by an A-frame top 28.

The first pair of frames 14 are formed by the ledges 24 and the feet 18 interconnecting upstanding posts 30. The top pairs of frames 26 are formed by the ledges 24 interconnecting a pair of posts 32 which are also interconnected by longitudinally extending top frame members 34 which meet at the juncture of the transversely extending A-frame members 28 disposed at the front and the rear of the driver station 16.

As seen in FIG. 1 the entire protective enclosure of FIG. 3 is enclosed by panels including panels 38, 40, 42 and 44. Thus, the protective enclosure is built into the panelled cab unit 10 and accordingly protects the operator of the tractor from all external forces including rollover of the tractor and uncomfortable weather conditions as well as undesirable noise.

Figure 2:
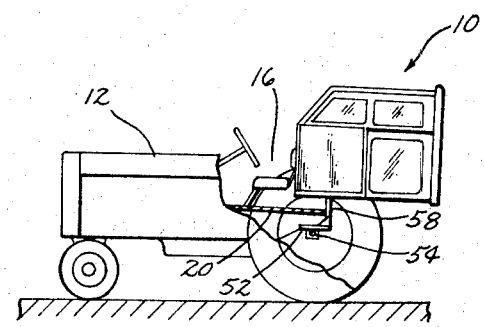
FIG. 2 is a reduced in scale fragmentary side elevation view of the protective enclosure and cab pivoted to a rearwardly extending position.
Figure 4:
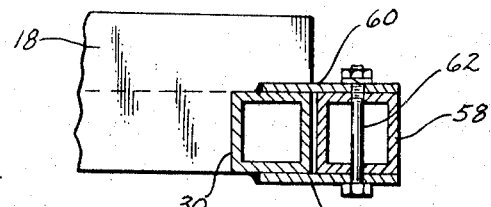
FIG. 4 is a cross-sectional view taken along line 4—4.

The protective enclosure and cab is secured in place on the platform 20 by a support structure 50 which includes a pair of rearwardly extending support members 52 rigidly secured to the tractor axle 54 (FIG. 2) by U-bolts 56. At the rearward ends of the members 52 are upstanding posts 58 which are received between a pair of plates 60 welded to the upper ends of the protective frame posts 30 as seen in FIG. 4. A bolt 62 is provided to extend through the rearwardly extending plate 60 embracing the posts 58 and thereby providing pivotal connection for the protective enclosure and cab 10 to pivot from a normal upright position as seen in FIG. 1 to a rearwardly extending position as seen in FIG. 2 wherein the unit 10 may be removed by simply removing the bolt 62.

It is noted that the upstanding support frame posts 58 extend along the protective enclosure frame posts 30 and thus function as a stop as well as a pivotal post for the unit 10. Normally the weight of the unit 10 will hold the cab in position on the tractor platform 20 particularly since the pivotal axis through the bolt 62 is relatively high at the back of the unit 10 as seen in FIG. 3.

Figure 5:
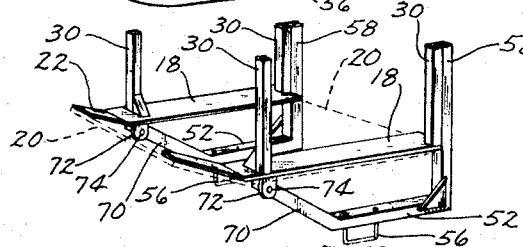
FIG. 5 is a fragmentary perspective view of an alternate embodiment of the protective enclosure and the support assembly.

However, as seen in FIG. 5, an alternate supporting structure may be provided which includes forwardly and upwardly extending frame members 70 integrally connected to the horizontal support frame members 52 adjacent the axle 54. The forward ends of the frame members 70 are detachably connected to downwardly extending ears 72 which extend through the platform 20 and are connected to the bottom ends of the frame posts 30. A conventional pin or the like 74 may be used to lock the frame members 70 to the ears 72. It is thus seen by this structure that the unit 10 is positively locked in place on the platform 20 but if it is desired to remove the unit 10 it is simply necessary only to remove the pin 74 and pivot the cab unit 10 rearwardly to the position of FIG. 2 and then remove the pin 62.

I claim:
1. In combination,
   a tractor having a driver station including a platform and a rear axle extending under said platform,
   a protective enclosure on said platform having an upstanding frame including interconnected frame members extending laterally and longitudinally of said tractor on said platform,
   means for securing said enclosure to said tractor,
   said means for securing said enclosure to said tractor including a support assembly having a pair of members on opposite sides of said enclosure secured to said rear axle and extending rearwardly thereof and a pair of upstanding members rigidly connected to the rear ends thereof and pivotally connected at their upper ends to said enclosure whereby said cab is adapted to be pivoted rearwardly about an axis through said pivotal connection.

2. The structure of claim 1 wherein said upstanding pair of members limit movement of said enclosure and cab on said platform.

3. The structure of claim 2 wherein said upstanding pair of members have said pivotal connection positioned substantially above the bottom of said enclosure and cab and the top of said tractor platform.

4. The structure of claim 3 wherein a pair of members are rigidly secured to said axle and extend forwardly thereof and are detachably connected to the forward side of said enclosure.

5. The structure of claim 4 wherein said pair of members extending forwardly of said axle extend upwardly and are integral with said pair of members extending rearwardly of said axle.

6. The structure of claim 1 wherein said protective enclosure includes a pair of upstanding side sections, laterally outwardly extending ledge sections secured to the upper ends of said side sections, a second pair of upstanding side sections extending upwardly from the outer sides of said ledge sections, and a roof section interconnecting said second pair of sections along their upper edges.

7. In combination,
a tractor having a driver station including a platform and a rear axle extending under said platform,
a protective enclosure on said platform having an upstanding frame including interconnected frame members extending laterally and longitudinally of said tractor on said platform,
means for securing said enclosure to said tractor,
said protective enclosure resting directly on said platform and upon said tractor being overturned the forces of said tractor are transmitted through said platform to said protective structure,
a cab unit enclosing said protective structure, and said cab unit substantially enclosing said platform and driving station,
said protective enclosure forming a frame for said cab which includes a plurality of panels secured to said frame,
said means for securing said enclosure to said tractor including a support assembly having a pair of members on opposite sides of said enclosure secured to said rear axle and extending rearwardly thereof and a pair of upstanding members rigidly connected to the rear ends thereof and pivotally connected at their upper ends to said enclosure whereby said cab is adapted to be pivoted rearwardly about an axis through said pivotal connection.

References Cited
UNITED STATES PATENTS

| | | | |
|---|---|---|---|
| 2,565,919 | 8/1951 | Hill | 296—28 |
| 2,783,056 | 2/1957 | Belk | 280—150 |
| 2,921,799 | 1/1960 | Hatten | 280—150 |
| 3,206,245 | 9/1965 | Westrum et al. | 296—102 |
| 3,244,251 | 4/1966 | Duncan | 296—102 |
| 3,360,295 | 12/1967 | Reynolds | 296—28 |

KENNETH H. BETTS, *Primary Examiner.*

L. D. MORRIS, JR., *Assistant Examiner.*

U.S. Cl. X.R.

296—102